United States Patent [19]

Vielbig

[11] 4,375,841

[45] Mar. 8, 1983

[54] FLUID FLOW APPARATUS FOR ACCOMMODATING A PRESSURE DROP

[75] Inventor: Leslie W. Vielbig, Ventura, Calif.

[73] Assignee: Fluid Kinetics Corporation, Ventura, Calif.

[21] Appl. No.: 274,840

[22] Filed: Jun. 18, 1981

[51] Int. Cl.³ .............................................. F01N 1/08
[52] U.S. Cl. ..................................... 181/272; 181/230
[58] Field of Search ............... 181/230, 238, 268, 272, 181/275; 137/625.3; 138/42; 251/127; 55/276; 173/DIG. 2; 415/119

[56] References Cited

U.S. PATENT DOCUMENTS

| | | | |
|---|---|---|---|
| 310,654 | 1/1885 | De Witt | 181/272 X |
| 4,011,922 | 3/1977 | Goplen | 181/272 |
| 4,113,050 | 9/1978 | Smith | 181/230 |
| 4,192,403 | 3/1980 | Nakagawa et al. | 181/272 X |

FOREIGN PATENT DOCUMENTS 594004 9/1925 France ............................ 181/238

*Primary Examiner*—L. T. Hix
*Assistant Examiner*—Thomas H. Tarcza
*Attorney, Agent, or Firm*—Nilsson, Robbins, Dalgarn, Berliner, Carson & Wurst

[57] ABSTRACT

An apparatus is disclosed for receiving a high pressure fluid flow to accommodate a drop to a lower pressure fluid flow with attenuated noise, incorporating an initial diffuser stage followed by balance in-line stages so that each stage is subcritical to avoid shock noise. Specifically, an elongated tubular member is closed at one end and adapted to receive high pressure fluid flow at the opposed end. Perforations contiguous to the upstream end afford a diffuser stage of pressure reduction which is followed by concentrically mounted, perforated plates to accomplish staged pressure drops. Structurally, the elongate tubular member is fixed somewhat concentrically in a cylindrical housing along with a series of the perforated plates which are peripherally supported by the housing and centrally supported by the elongated tubular member.

A diffuser as the first stage affords superior strength to withstand impacts and pressure loading. The subsequent perforated plate stages are balanced so that the pressure drop across each of the plates is preserved below the critical level. Supporting the plates concentrically by an extension of the elongated tubular member as well as peripherally by the housing affords an effective economical and durable pressure reduction structure.

6 Claims, 2 Drawing Figures

FLUID FLOW APPARATUS FOR ACCOMMODATING A PRESSURE DROP

BACKGROUND AND SUMMARY OF THE INVENTION

Systems which accommodate the flow of relatively high pressure fluids sometimes involve significant pressure drops across a specific element or apparatus. For example, a valve might act as a pressure let-down device receiving fluid at a high pressure and discharging the fluid to a significantly lower pressure. For proper operation of such a valve, it is likely that an adequate pressure drop must be maintained across the valve to assure the passage of a desired amount of flow. However, as the pressure drop across a valve increases, it reaches a critical level, above which shock noise is created. Such noise can be upwards of twenty to twenty-five dB above the normal velocity created turbulent noise resulting from fluid passing through the valve. Accordingly, in the interests of noise reduction, often it is important to restrict the pressure drop across a valve or other pressure let-down device to the critical level.

It has been previously proposed to provide various forms of pressure-reducing devices for use with valves to distribute pressure drops so as to maintain each drop below the critical level. Of course, the need for pressure-reducing, noise-attenuation devices is not specifically limited to applications involving fluid valves. In any event, although various forms of noise attenuated, pressure-reducing valves have been previously proposed, a need continues to exist for such an apparatus which is economical, strong, rugged, and effective in attenuating noise as well as accommodating a desired rate of fluid flow.

In general, the present invention involves a somewhat concentric structure in which a central elongated tubular member serves to provide an initial diffuser for a first stage of pressure reduction which is capable of withstanding impact forces and pressure loading. The first diffuser stage is closed by a housing which also cooperates with the elongate tubular member to support a series of perforated plates defining pressure-reducing stages. Accordingly, the desired pressure drop is effectively distributed in a plurality of stages, none of which exceeds the critical pressure drop resulting in shock noise.

BRIEF DESCRIPTION OF THE DRAWINGS

The drawings disclose an illustrative embodiment of the present invention which serves to exemplify the various advantages and objects thereof, and which are as follows.

DETAILED DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment herein. Consequently, the specific structural and functional details disclosed herein are merely representative, yet in that regard they are deemed to provide the best embodiment for purposes of disclosure and to establish a foundation as a basis for the claims herein which define the scope of the present invention.

Figure 1:
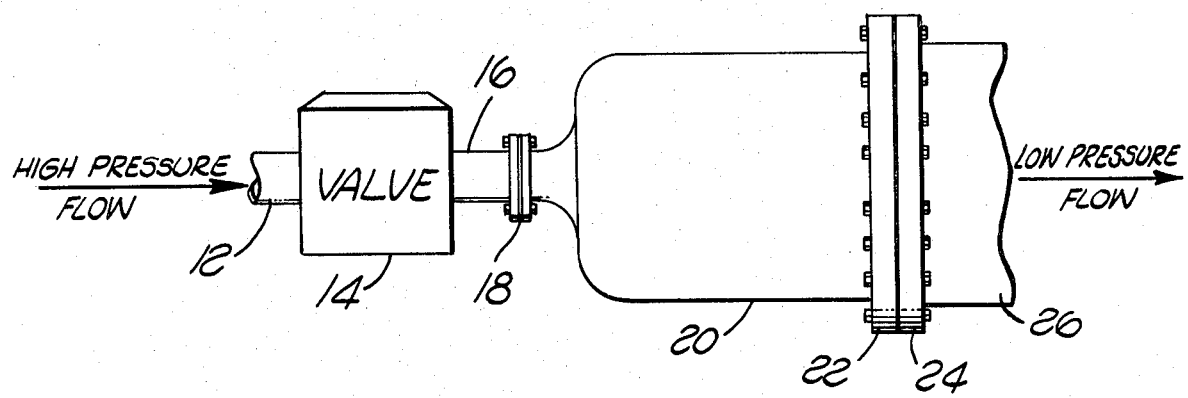
FIG. 1 is a diagrammatic representation of a system incorporating an apparatus for accommodating pressure drops and constructed in accordance with the present invention.

Referring initially to FIG. 1, a fluid supply line 12 is illustrated as receiving high pressure fluid flow for delivery to a valve 14. Essentially, the valve 14 passes fluid at a predetermined flow rate to a duct 16 incorporating a flanged coupling 18 to a pressure-reduction accommodation apparatus 20 constructed in accordance with the present invention.

The downstream end of the apparatus 20 incorporates an enlarged connection flange 22 which mates with a similar flange 24 of a reduced-pressure pipe 26. Accordingly, the apparatus 20 receives fluid from the valve 14 through a duct 16, which is still at a relatively high pressure and supplies the fluid stream to the pipe 26 at a substantially reduced pressure. Functioning in that capacity, the apparatus 20 incorporates a plurality of pressure-drop stages with the consequence that no single pressure drop exceeds the critical level and shock noise is avoided. For example, to consider representative values, the high pressure flow in the supply line 12 might be at 500 psi. Pursuing such an exemplary value, the pressure drop across the valve 14 might be 250 psi. with the consequence that the pressure in the duct 16 would be 250 psi. In the operation of the apparatus 20, an aggregate pressure drop of some 230 psi. may be appropriate to deliver fluid in the pipe 26 at a pressure slightly above ambient. The pressure drop accomplished by the apparatus 20 is staged with the consequence that no individual drop exceeds the critical shock noise level. For a consideration of the structural details of the apparatus 20, reference will now be made to the sectioned representation of FIG. 2.

The apparatus 20 incorporates a coupling flange 28 (an element of coupling 18 (FIG. 1)) through which pressurized fluid is received. Beyond the flange 28, in the apparatus 20, an initial diffusion section is provided, generally indicated at 29 to develop a first stage of reduced pressure in a volume or space 30. The flow path then includes passages through a plurality of plates defining spaces 32, 34, 36, and 38 each of which receives fluid at a reduced pressure. Accordingly, after the diffuser section 29 steps the pressure to a lower level, subsequent pressure drops are distributed along spaces 30, 32, 34, 36, and 38 so that no signel drop is above the critical shock level.

Figure 2:
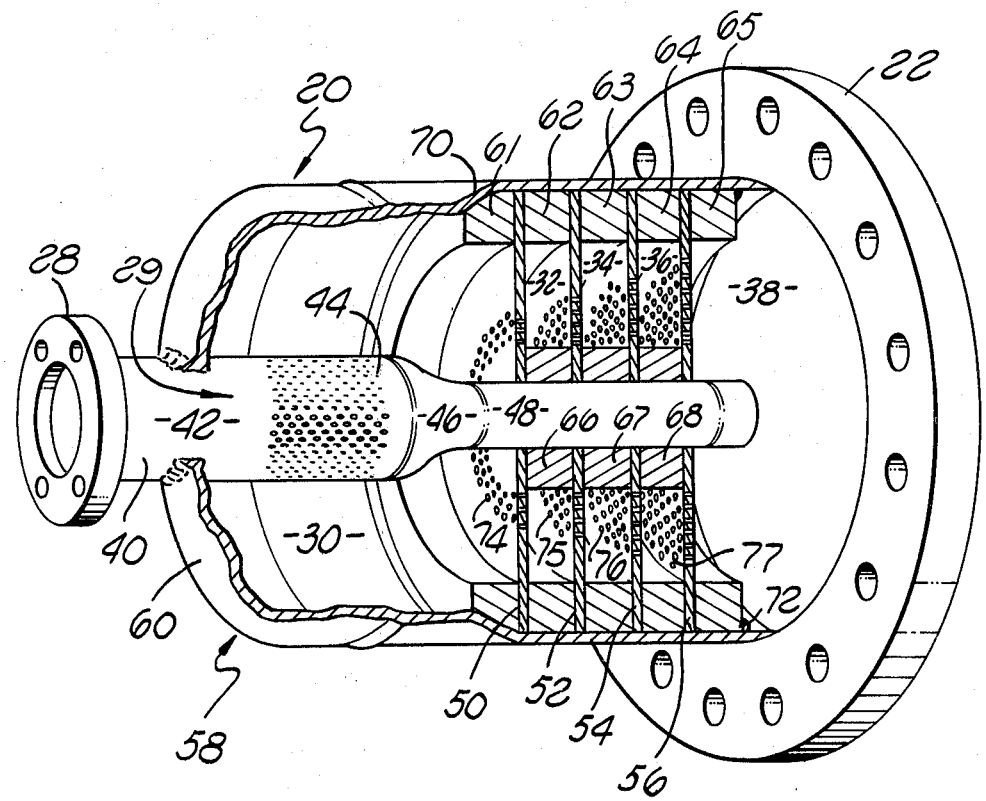
FIG. 2 is a sectioned perspective view of the apparatus of FIG. 1.

Considering the structure of FIG. 2 in somewhat greater detail, the flange 28 is integral with an elongated member or core 40, the first section 42 of which is tubular and defines a band 44 of perforations accommodating fluid flow into the space 30. Extending from the section 42 of the core 40 is a reducing section 46 which is integrally connected to a closed support section 48. Functionally, the section 42 of the core 40 provides an element of the diffuser 29 while the section 48 (or reduced diameter) provides central support for a series of perforated plates 50, 52, 54, and 56. As disclosed in further detail below, the plates 50, 52, 54, and 56 are supported between the core 40 and a housing 58 which also serves to enclose the spaces 30, 33, 34, 36, and 38.

The structure of the apparatus 20 is generally concentric from the intake flange 28 to the large terminal flange 22. Specifically, the core 40 is concentrically affixed in the otherwise-closed forward end 60 of the cylindrical housing 58. Inside the housing 58, beyond the section 46 of the core 40, the circular perforated plates 50, 52, 54, and 56 receive the core section 48 at their centers and extend radially to the inner wall of the cylindrical housing 58. Spacer rings of large and small diameters are affixed between the plates adjacent the section 48 and at the housing 58. Specifically, spacer rings 61, 62, 63, 64, and 65 of coincident diameter with the plates 50, 52, 54, and 56 are provided adjacent the outside edges of the plates affixed to the housing 58. At the core 40, smaller diameter rings 66, 67, and 68 closely accommodate the section 48 of the core 42 and support the plates maintaining the spaces 32, 34, and 36.

It may be recognized that any of a variety of techniques may be employed to manufacture the apparatus 20. Exemplary of such processes and techniques, components of the structure may be formed as individual subassemblies. In that regard, the core 40 may include a length of pipe as the section 42 connected by the reducing section 46 to a length of solid rod forming the section 48. Such components of the core 40 may be welded together or otherwise joined as an integral subassembly.

The housing 58 essentially comprises a steel tank element in the disclosed embodiment and may be manufactured using well known metal forming techniques of the industry. Note that the housing includes sections of slightly different diameter, the housing being enlarged remote from the end 60 to accommodate the rings 61–65 in stacked alignment. The downstream end of the housing 58 is open and is received in the flange 22, being welded or otherwise fixed therein. Similar joining techniques may be employed for affixing the core 40 in the housing end 60.

After completing the assembly of the core 40 and the housing 58, the plate assembly may be accomplished by seating the rings and the formed plates. Specifically, the ring 61 is first placed in position to abut an annular shoulder 70 defined in the housing 58. Next, the perforated plate 50 is set in position followed by the rings 62 and 66. When all of the rectangular-section rings and apertured plates are in position to provide a rigid structure, a weldment 72 is provided between the ring 65 and the housing 58 for holding the plate assembly locked in position.

Note that the plates 50, 52, 54, and 56 each define apertures or perforations of an increased total aggregate section or area. In that manner, pressure differentials are compensated to attain relatively balanced pressure drops across each of the plates for greater stability.

In the operation of the apparatus 20, assuming the exemplary pressures, as discussed above, the section 42 of the core 40 would receive fluid at a pressure of 250 psi. Fluid at that pressure would be exhausted through the band 44 of perforations in the core 42 (diffuser section) stepping the pressure down to approximately 180 psi. in the chamber or space 30. From that pressure, decremental pressure changes would occur across each of the plates 50, 52, 54, and 56 because of the increasing area of the multiple orifices or perforations 74, 75, 76, and 77 respectively in each of the plates. Consequently, for example, the exemplary pressures in the chambers 32, 34, 36, and 38 might be 140, 100, 60, and 20 psi. respectively. None of the drops would exceed the critical pressure to develop shock noise. Consequently, the sound or noise of the apparatus 20 would be essentially limited to the normal flow or turbulent noise which, under most circumstances, is tolerable.

Summarizing, in the operation of the apparatus 20, the diffuser 29 accommodates high pressure operation and is generally able to withstand related shock forces. Downstream from the diffuser 29, the perforated plates 50, 52, 54, and 56 accomplish distributed pressure drops that are balanced so that no drop at any one plate exceeds the critical level. Of course, the plate assembly is retained by the central core 40 acting in combination with the housing 58 affording peripheral support acting through the rings 61–65. In general, the structure accommodates the use of flat plates with considerable economy and ease of assembly. Of course, in that regard, the core 40 is a key element in providing a diffuser and centrally supporting the plates to avoid buckling.

As indicated above, the structure hereof may be variously embodied. Recognizing the various modifications that will be apparent, the scope hereof shall be deemed to be as defined by the claims as set forth below.

What is claimed is:

1. An apparatus for receiving a high pressure fluid flow to accommodate a drop to a lower pressure fluid flow with attenuated noise, comprising:

an elongated member having one end closed and another end adapted to be connected to receive said high pressure fluid flow, said elongated member defining perforations in a section thereof centrally offset toward said other end;

a plurality of plates somewhat concentrically supported on said elongated member at spaced locations and centrally offset from said perforations toward said closed end from said perforations, said plates defining multiple orifices of increasing aggregate area in the order of said plates from said other end of said elongated member;

a cylindrical housing enclosing said section of said elongated member containing said perforations and receiving said plates to define pressure reduction spaces therebetween; and connection means affixed to said cylindrical chamber for passing said lower pressure fluid flow.

2. An apparatus according to claim 1 further including a series of support rings provided between said plates.

3. An apparatus according to claim 2 wherein said support rings comprise rings of substantially coincident diameter with said plates fitted in stacked alignment therewith.

4. An apparatus according to claim 2 wherein said support rings comprise rings to closely accommodate said elongated member to centrally support said plates.

5. An apparatus according to claim 2 wherein said support rings comprise rings of substantially coincident diameter with said plates fitted in stacked alignment therewith and rings to closely accommodate said elongated member to centrally support said plates.

6. An apparatus according to claim 5 wherein said cylindrical housing defines a section of increased diameter to accommodate said rings of substantially coincident diameter with said plates.

* * * * *